US008052105B2

(12) United States Patent
Lippert et al.

(10) Patent No.: US 8,052,105 B2

(45) Date of Patent: Nov. 8, 2011

(54) HOLDER FOR A LOUDSPEAKER BOX

(75) Inventors: Helmut Lippert, Breitenbrunn (DE); Peter Reichert, Urspringen (DE)

(73) Assignee: Koenig & Meyer GmbH & Co. KG, Wertheim (DE)

( * ) Notice: Subject to any disclaimer, the term of this patent is extended or adjusted under 35 U.S.C. 154(b) by 165 days.

(21) Appl. No.: 12/336,097

(22) Filed: Dec. 16, 2008

(65) Prior Publication Data

US 2009/0159771 A1 Jun. 25, 2009

(30) Foreign Application Priority Data

Dec. 19, 2007 (EP) .................................... 07024570

(51) Int. Cl.
*F16M 11/04* (2006.01)

(52) U.S. Cl. ............. 248/187.1; 248/217.2; 248/222.13; 248/224.7; 248/316.2; 411/21; 411/44

(58) Field of Classification Search .................. 248/518, 248/519, 412, 187.1, 217.2, 220.31, 222.13, 248/224.7, 224.8, 231.9, 231.91, 309.2, 316.2; 411/21, 25, 33, 36, 44
See application file for complete search history.

(56) References Cited

U.S. PATENT DOCUMENTS 1,103,839 A * 7/1914 Rellay .......................... 248/412
1,106,909 A * 8/1914 Zifferer ................... 248/231.91
1,169,635 A * 1/1916 Grimes ......................... 411/344
1,311,038 A * 7/1919 Bowman ....................... 248/637
1,647,986 A * 11/1927 Dickinson .................. 248/187.1
3,534,650 A * 10/1970 Kubokawa .................... 411/344
4,042,778 A 8/1977 Clinton
4,113,222 A * 9/1978 Frinzel .......................... 248/412
4,693,389 A * 9/1987 Kalen ........................... 220/236
4,716,674 A * 1/1988 Kammeraad ................. 43/27.4
4,765,580 A 8/1988 Wright
5,170,979 A * 12/1992 Baber ........................ 248/309.2
5,273,382 A * 12/1993 Yearick ............................ 411/64
5,383,621 A * 1/1995 Alexander .................... 242/130
5,704,578 A 1/1998 Fischer
6,109,578 A * 8/2000 Guthrie et al. ............. 248/231.9
6,328,269 B1 12/2001 Krautloher
6,460,815 B1 * 10/2002 Thaler ........................ 248/187.1
6,609,686 B2 * 8/2003 Malizia ...................... 248/125.8
6,866,455 B2 * 3/2005 Hasler ............................. 411/21
7,264,216 B1 9/2007 Robling et al.
7,552,900 B2 * 6/2009 Yoon ............................ 248/412
2001/0026744 A1 * 10/2001 Nettis ............................ 411/21
2007/0257171 A1 * 11/2007 Reeves ....................... 248/231.9

FOREIGN PATENT DOCUMENTS

GB 2 294 386 5/1996

* cited by examiner

*Primary Examiner* — Terrell McKinnon
*Assistant Examiner* — Bradley Duckworth
(74) *Attorney, Agent, or Firm* — Greenblum & Bernstein, PLC

(57) ABSTRACT

A holder for a loudspeaker box onto which the loudspeaker box can be slipped. The holder includes a control handle and a clamping device actuatable without tools via the control handle.

16 Claims, 2 Drawing Sheets

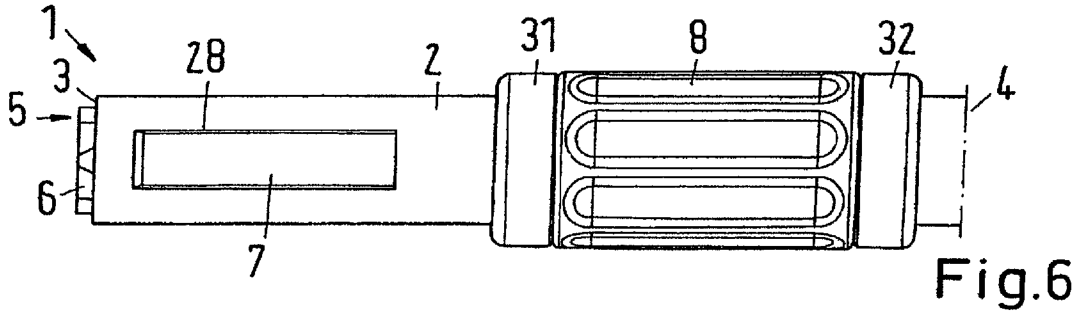
Fig.6
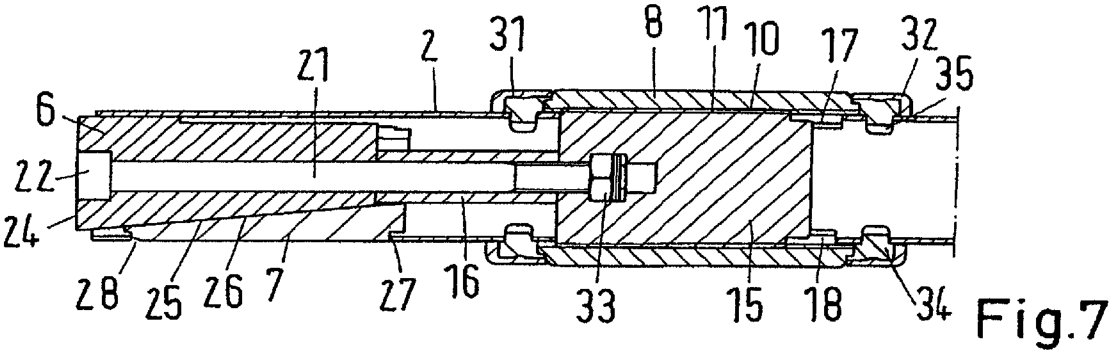
Fig.7
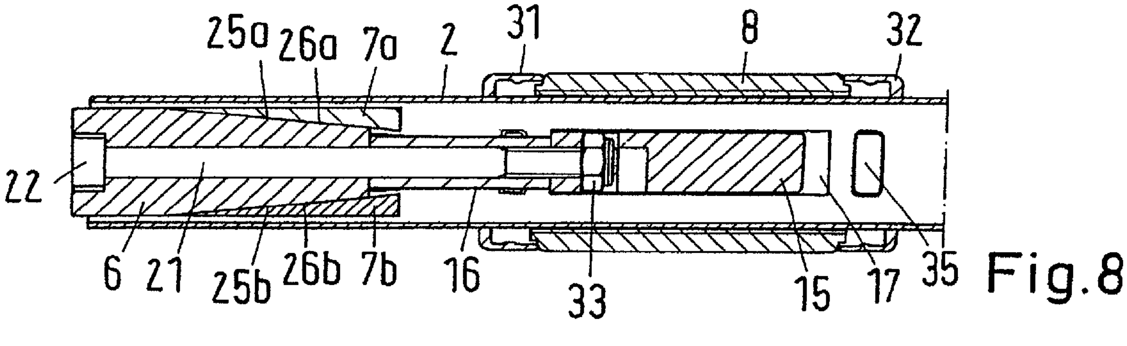
Fig.8
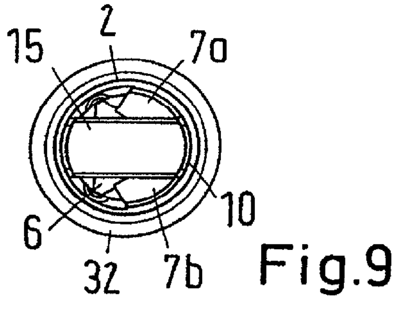
Fig.9
Fig.10
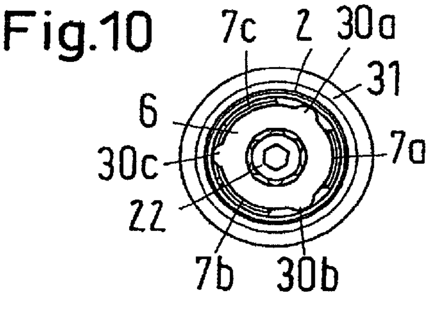

HOLDER FOR A LOUDSPEAKER BOX

CROSS-REFERENCE TO RELATED APPLICATIONS

The present application claims priority under 35 U.S.C. §119 of European Patent Application No. 07 024 570.9 filed on Dec. 19, 2007, the disclosure of which is expressly incorporated by reference herein in its entirety.

BACKGROUND OF THE INVENTION

1. Field of the Invention

The invention relates to a holder for a loudspeaker box onto which the loudspeaker box can be slipped.

2. Discussion of Background Information

Loudspeaker boxes are used, e.g., at music events. They are generally arranged on box stands or box tripods. It is also conceivable for the loudspeaker boxes to be attached via wall holders.

For attachment, loudspeaker boxes generally have a flange that is embodied or formed in the broadest sense as a hollow cylinder. This flange serves to receive a cylindrical part of a box stand. However, because the flange of the loudspeaker box does not have the same diameter for all loudspeaker boxes, the connection between the flange and the cylindrical part of the box stand is affected by play. This is due, among other things, to the fact that loudspeaker boxes in Europe have a flange inside diameter of 35 mm, while loudspeaker boxes in the U.S.A. have a flange inside diameter of, e.g., 1.5 inches or approx. 38 mm. As a result, the support of a loudspeaker box on a box stand of this type is still relatively unstable. In addition, the flanges are often not embodied or formed on the inside in an exactly hollow cylindrical manner, but instead are formed to have tapers. Thus, play between the flange and the cylindrical part of a box stand is unavoidable.

Although the play between the loudspeaker box and the box stand facilitates the placement and removal of the loudspeaker box, it also means that the loudspeaker box can vibrate on the box stand, which can lead to acoustic problems. The loudspeaker box is not clearly fixed with respect to the box stand, either, so that the position of the loudspeaker box can change during operation, which is generally undesirable.

SUMMARY OF THE INVENTION

The invention renders possible a quick and secure attachment of the loudspeaker box.

According to embodiments of the invention, a holder of the type mentioned at the outset includes a clamping device that can be actuated without tools via a control handle.

The clamping device is received in the interior of the flange of the loudspeaker box, when the loudspeaker box is placed on the holder. Through actuation of the control handle, a bracing of the clamping device in the flange of the loudspeaker box occurs, so that no more play occurs between the holder and the flange of the loudspeaker box. Since the tensioning is possible without tools, the locking of the loudspeaker box on the holder can take place relatively quickly. In order to remove the loudspeaker box it is then necessary merely to release the clamping device with the aid of the control handle.

The assembly and disassembly of the loudspeaker box on the holder is therefore very simple. The loudspeaker box can thereby also be held by the clamping device in a predetermined position with respect to the holder. Further, differing diameters of the flange of the loudspeaker box can also be compensated by the clamping device.

It is particularly preferred for the holder to have a tubular housing, in which the clamping device is arranged. The clamping device has at least one clamping element that can be moved radially through an opening in the housing. The tubular housing is thereby adapted to the shape of the flange of the loudspeaker box. The clamping device itself is thereby located essentially protected inside the housing. When the clamping device is released, the clamping elements are likewise located essentially in the interior of the housing. The clamping elements are not moved radially outwards through an opening in the housing until the clamping device is actuated. This corresponds to a movement perpendicular to the placement direction of the loudspeaker box. The clamping elements then bear against the flange of the loudspeaker box from the inside under a certain force. Any play existing between the flange and the holder is thereby eliminated, wherein the loudspeaker box is held in a clamping manner.

Preferably the clamping device has an expanding wedge that can be moved axially in the housing and interacts via at least one wedge surface with at least one mating wedge surface of the clamping element. Through the axial movement of the expanding wedge the wedge surface interacts with the mating wedge surface and thus displaces the clamping element radially outwards so that it bears against the flange of the loudspeaker box from inside. A power transmission thereby takes place via the expanding wedge so that an adequate clamping effect can be achieved with relatively low actuating forces. In order to be able to generate and transfer relatively large clamping forces it is advantageous thereby if the wedge surface and the mating wedge surface are embodied as flat surfaces, so that they bear flat against one another regardless of the movement of the expanding wedge. It is also conceivable for each clamping element to have several mating wedge surfaces that are arranged one behind the other in the axial direction. The expanding wedge should then have a corresponding number of wedge surfaces. The clamping element can then be embodied longer without it becoming unnecessarily wide in the radial direction.

It is particularly preferred thereby for the clamping device to have several clamping elements that are arranged radially-symmetrically around the expanding wedge. With a radial-symmetrical arrangement of several clamping elements, it is ensured that the loudspeaker box is centered with respect to the clamping device during actuation of the clamping device. Each clamping element is then pressed radially outwards through its own opening in the housing when the expanding wedge is correspondingly moved axially. For example, three clamping elements can thereby be provided. This larger number of clamping elements in principle renders possible a better distribution of the clamping pressure.

Advantageously, the control handle is embodied or formed as a rotary handle that acts on a slide element arranged in the housing in a rotationally fixed and axially moveable manner. The slide element is connected to the expanding wedge. The connection between the expanding wedge and the slide element can thereby be carried out directly or indirectly. A rotary handle represents a relatively simple way of rendering possible an actuation without tools. If the rotary handle has a correspondingly large diameter, relatively large control forces can be generated by hand that act on the slide element. The axial movement of the slide element then causes a tightening of the clamping device.

It is particularly preferred thereby that the rotary handle surrounds the housing in an annular manner. The rotary handle is thus arranged in a particularly space-saving manner.

However, the housing should be embodied or formed to be so long that the rotary handle is not received in the flange of the loudspeaker box. Further, during the slipping-on it can also be ensured, if necessary, that the rotary handle is not accommodated inside the flange, because the holder is not completely introduced into the flange of the loudspeaker box. Since the rotary handle surrounds the housing in an annular manner, it can be embodied for formed with a relatively large diameter. Thus, the required control forces can be applied easily.

Advantageously, the slide element is connected to the rotary handle by at least one longitudinal groove in the housing. Thus, the transmission of the drive force to the expanding wedge takes place via the slide element. The rotary handle can already cover the longitudinal groove in the housing thereby, so that no foreign bodies can penetrate into the housing. The provision of one or two longitudinal grooves weakens the housing thereby only slightly. At the same time, through the guiding of the slide element in the longitudinal groove(s) it can be ensured that the slide element is fixed with respect to the housing in a rotationally fixed and axially moveable manner. Additional elements are then not required.

Preferably, a spacer element is arranged between the slide element and the expanding wedge. This spacer element should thereby have a slight radial extension such that it can be inserted between the clamping elements even when the clamping elements are completely released. In particular, the cross section of the spacer element should be smaller than a front face of the expanding wedge, in which the front face faces the spacer element. Via the spacer element, the slide element is then prevented from moving against the clamping elements. A jamming of the clamping device and damage to it is thereby avoided.

In a preferred exemplary embodiment, the slide element is embodied or formed as a pin that is guided through a radial passage opening in the spacer element. The pin is therefore held in the spacer element positively. It can thereby be connected to the rotary handle at both of its ends by the grooves in the housing, and thus can ensure a good transmission of force.

Preferably, the expanding wedge is connected to the spacer element via a screw bolt, which is screwed into the spacer element. A screw bolt provides a simple possibility for connecting the spacer element to the expanding wedge. The screw bolt can thereby be inserted from a front face of the expanding wedge, in which the front face faces away from the spacer element. The screw bolt then passes axially through the expanding wedge. A corresponding recess can be provided on the front face of the expanding wedge to receive a head of the screw bolt.

Preferably, the rotary handle has an internal thread that engages with a corresponding external thread of the holder, such that the slide element is guided in an annular groove of the rotary handle. Upon activation of the rotary handle, a rotation of the rotary handle therefore takes place, and an axial movement between the rotary handle and the holder due to the mating threads. Since the slide element embodied or formed as a pin is guided in an annular groove of the rotary handle and in the longitudinal grooves of the housing, only the axial movement of the rotary handle is transmitted to the slide element and thus to the expanding wedge. An opening can be provided in the rotary handle thereby for easier insertion of the slide element at a point of the annular groove.

Preferably, the external thread is arranged thereby on an annular sleeve that is fixed to the housing. The housing of the holder therefore does not have to be provided with an external thread itself, so that it can be manufactured relatively cost-efficiently. On the other hand, it is relatively simple to provide an annular sleeve with a thread. This can be adhered to the housing, for example.

Advantageously, the annular sleeve is connected to the housing via a bolt that extends radially through the housing and into the openings of the annular sleeve. The bolt ensures an axial and rotationally fixed connection between the annular sleeve and the housing.

Advantageously, the openings are covered by the rotary handle. Thus, a loss of the bolt and a releasing of the annular sleeve from the housing are reliably prevented, even with strong vibrations of the holder.

In a further preferred embodiment, the rotary handle is axially fixed on the housing. The rotary handle itself therefore cannot perform an axial relative movement with regard to the housing. In this way, a jamming of the hand of a user between the rotary handle and the housing of the holder is virtually excluded. It is also possible to use the holder in confined conditions, since no additional space needs to be provided for an axial movement of the rotary handle. Thus, the application possibilities of the holder are broadened.

It is particularly preferred thereby that the slide element has at least one thread surface that is engaged with the internal thread of the rotary handle. The slide element thereby projects with the thread surface through the longitudinal grooves in the housing. An axial guiding of the slide element thus takes place at the same time. It is advantageous if the slide element has two thread surfaces that are arranged opposite one another, so that a symmetrical transmission of the control forces to the slide element can take place.

Advantageously, the expanding wedge is connected to the slide element via the screw bolt, which is guided through the spacer element. Therefore, in this embodiment, not only the screw bolt, but also the spacer element has a passage opening through which the screw bolt is guided. The three parts expanding wedge, spacer element, and slide element can then be clamped together with the aid of the screw bolt, whereby play is prevented.

It is particularly preferred thereby that the screw bolt is held positively in the slide element with a nut. It is therefore not necessary to introduce an internal thread into the slide element, which is relatively expensive. Instead, for example, a nut that can be screwed onto the screw bolt is introduced in a radial recess that is connected to an axial opening through which the screw bolt is introduced. This results in a very cost-effective and secure connection.

Preferably, the rotary handle is fixed on the housing with two clamping rings. Clamping rings represent a relatively simple method for fixing the rotary handle axially with respect to the housing and at the same time for allowing a rotary movement.

Advantageously, the clamping rings thereby have catch projections that engage in catch openings of the housing. The clamping rings are therefore held on the housing not only through their clamping force, but also simultaneously with the aid of the catch projections. In this manner, a very secure connection of the clamping rings to the housing is guaranteed, through which at the same time a loss of the rotary handle is virtually excluded.

Embodiments of the invention are directed to a holder for a loudspeaker box onto which the loudspeaker box can be slipped. The holder includes a control handle and a clamping device actuatable without tools via the control handle.

According to embodiments of the invention, the holder can further include a tubular housing in which the clamping device is arranged. The clamping device can have at least one clamping element structured and arranged to be radially movable through an opening in the housing. Further, the clamping device may have an expanding wedge structured and arranged for axial movement in the housing, and the expanding wedge can have at least one wedge surface and the clamping element can have at least one mating wedge surface, and the at least one wedge surface may be structured and arranged to interact with the at least one mating wedge surface. The clamping device can have several clamping elements structured for radial movement through openings in the housing and arranged radially symmetrically around the expanding wedge.

In accordance with another feature of the invention, the holder can further include a slide element arranged in the housing in a rotationally fixed and axially moveable manner, and the slide element can be connected to the expanding wedge. The control handle may include a rotary handle arranged to act on the slide element. The rotary handle can surround the housing in an annular manner. The slide element may be connected to the rotary handle by at least one groove in the housing.

According to still another feature, the holder can include a spacer element arranged between the slide element and the expanding wedge. The spacer element can have a radial passage opening and the slide element may include a pin guidable through a radial passage opening. The holder may also include a screw bolt connecting the expanding wedge to the spacer element. The screw bolt may be screwed into the spacer element.

In accordance with another feature, the rotary handle has an internal thread that engages with a corresponding external thread of the holder, and the slide element can be guided in an annular groove of the rotary handle. Further, an annular sleeve can be fixed to the housing, and the external thread can be arranged on the annular sleeve. The annular sleeve may have openings and may be connected to the housing by a bolt extending radially through the housing and into the openings in the annular sleeve. The openings can be covered by the rotary handle.

In accordance with still yet another feature of the present invention, the rotary handle may be axially fixed on the housing. The slide element may have at least one thread surface that is engageable with the internal thread of the rotary handle. Further, the expanding wedge can be connected to the slide element by a screw bolt, and the screw bolt can be guided through the spacer element. The screw bolt may be positively held in the slide element with a nut. Further, the holder can also include two clamping rings, and the rotary handle may be fixed on the housing with the two clamping rings. The housing can have catch openings, and the clamping rings can have catch projections structured and arranged to engage in the catch openings.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 6 illustrates a second embodiment of a holder according to the invention;

FIG. 7 illustrates a sectional view of the holder depicted in FIG. 6;

FIG. 8 illustrates a further sectional view of the holder depicted in FIG. 6;

FIG. 9 illustrates a view of the holder depicted in FIG. 6 from a front face; and FIG. 10 illustrates a view of the holder depicted in FIG. 6 from a second front face.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
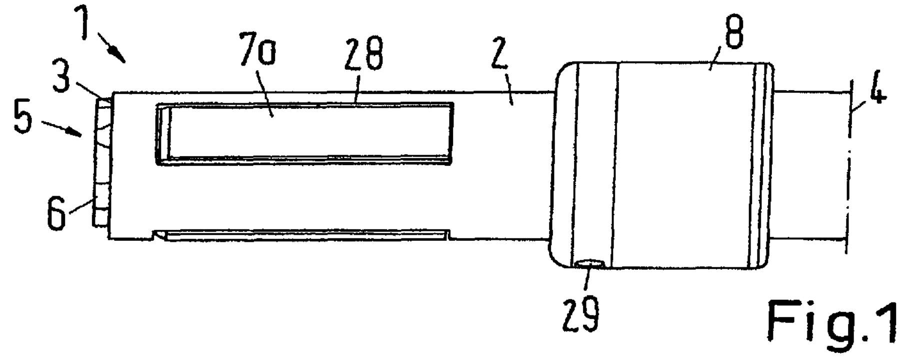
FIG. 1 illustrates a first embodiment of a holder for a loudspeaker box according to the invention.

FIG. 1 shows a holder 1 for a loudspeaker box, not shown. Holder 1 has a tubular housing 2 embodied or formed to be open on its two front faces 3 and 4. A clamping device 5 is inserted into holder 1 from front face 3. Clamping device 5 has an expanding wedge 6 and clamping elements 7 and can be actuated via a rotary handle 8. Rotary handle 8 is arranged to surround housing 2 in an annular manner and is supported on housing 2 via mating threads.

A recess can be provided on front face 4 of housing 2 in order to be able to fix holder 1 on various objects, such as, for example, tripods. It is also possible, however, to lengthen holder 1 on its front face 4 and thus, for example, to embody or form housing 2 in one piece as a tripod or as a wall holder. It is also conceivable to insert a clamping device 5 likewise into front face 4, so that housing 2 must then have a correspondingly large axial extension. If holder 1 has two clamping devices 5, for example, two loudspeaker boxes such as subwoofer and satellite box can be connected to one another.

Figure 2:
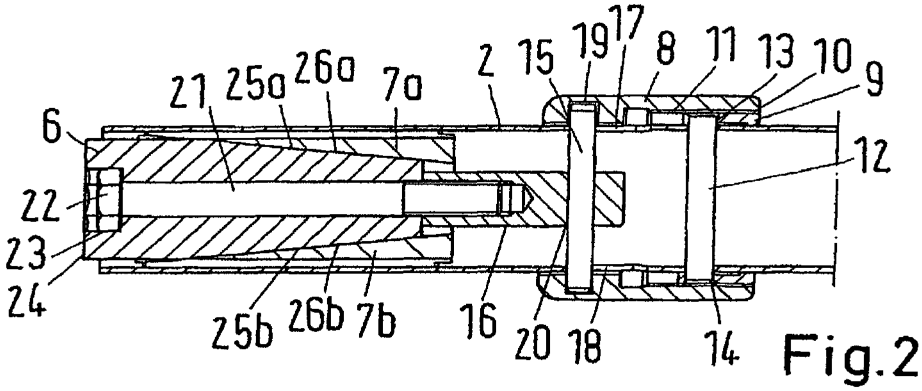
FIG. 2 illustrates a sectional view of the holder depicted in FIG. 1.

FIG. 2 shows a cross-sectional view of holder 1 depicted in FIG. 1. An annular sleeve 9 is arranged between housing 2 and rotary handle 8 surrounding housing 2 in an annular manner. Annular sleeve 9 has an external thread 10 that interacts with an internal thread 11 of rotary handle 8, and is connected to housing 2 via a bolt 12. Bolt 12 extends radially through housing 2 and into openings 13 and 14 in annular sleeve 9. In this way, annular sleeve 9 is fixed with regard to housing 2. Openings 13 and 14 are covered by rotary handle 8, so that a loss of the bolt 12 is prevented.

Rotary handle 8 is connected to expanding wedge 6 via a slide element 15 and a spacer element 16. In this embodiment, slide element 15 is embodied or formed as a pin that extends radially through housing 2 and is guided axially in two longitudinal grooves 17 and 18 in housing 2. In rotary handle 8, slide element 15 is guided in an annular groove 19 that is axially fixed with regard to rotary handle 8. A rotary movement between rotary handle 8 and slide element 15 is possible thereby.

Slide element 15 is guided through a passage opening 20 in spacer element 16 and thus is positively connected to spacer element 16. A screw bolt 21 is provided for connecting spacer element 16 and expanding wedge 6, so that a bolt head 22 of screw bolt 21 is accommodated in a recess 23 at a front face 24 of expanding wedge 6, and head 22 of screw bolt 21 ends flush with front face 24.

Expanding wedge 6 interacts via wedge surfaces 25*a* and 25*b* with mating wedge surfaces 26*a* and 26*b* of clamping elements 7*a* and 7*b*.

Figure 3:
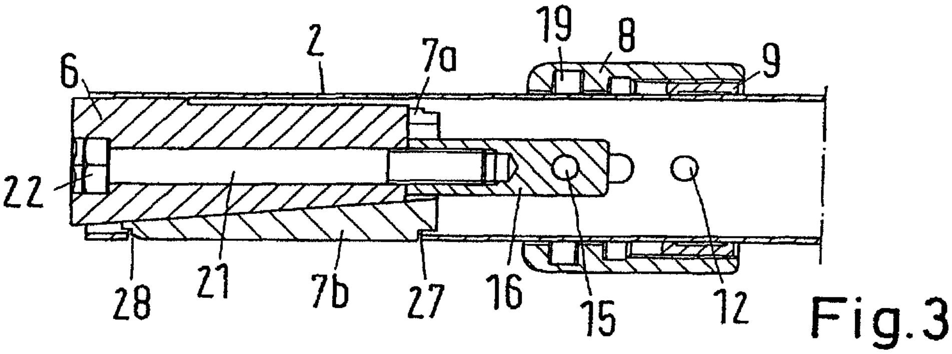
FIG. 3 illustrates a further sectional view of the holder depicted in FIG. 1.

When rotary handle 8 is actuated, an axial displacement of expanding wedge 6 takes place and thereby a radial displacement of clamping elements 7*a* and 7*b*. Moreover, with a corresponding rotation of rotary handle 8, which leads to an axial displacement of rotary handle 8 according to FIG. 2 to the right, slide element 15, which is guided in longitudinal grooves 17, 18, is likewise displaced to the right. In this manner, spacer element 16 and expanding wedge 6 also move axially to the right. An axial movement of clamping elements 7*a* and 7*b* is prevented by step-shaped shoulders, see FIG. 3. Through the interaction of wedge surfaces 25 with mating wedge surfaces 26, the axial displacement of expanding wedge 6 effects a radial displacement of clamping elements 7, which are moved radially outwards through openings 28 in housing 2.

For easier introduction of slide element 15, rotary handle 8 can be provided with an opening 29 that is connected to annular groove 19, see FIG. 1.

Figure 4:
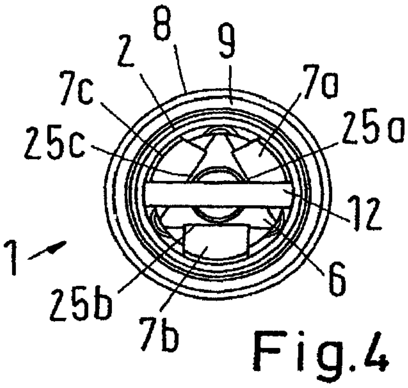
FIG. 4 illustrates a view of the holder depicted in FIG. 1 from a front face.

In FIG. 4, holder 1, seen from its front face 4, is shown. It can be discerned that clamping device 5 has three clamping elements 7*a*, 7*b*, and 7*c* and expanding wedge 6 correspondingly has three wedge surfaces 25*a*, 25*b*, and 25*c*. Since rotary handle 8 surrounds housing 2 in an annular manner, it can have a relatively large diameter. It is possible in this regard to produce relatively large actuating forces with relatively small control forces.

Figure 5:
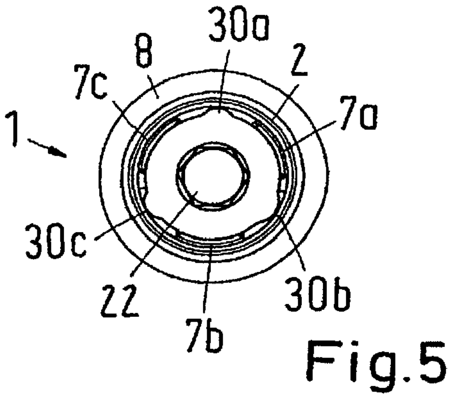
FIG. 5 illustrates a view of the holder depicted in FIG. 1 from a second front face.

In FIG. 5, holder 1, seen from front face 3, is shown. Expanding wedge 6 is guided axially in housing 2 via guide webs 30*a*, 30*b*, and 30*c*, so that a tipping of expanding wedge 6 is prevented. Guide webs 30*a*, 30*b*, and 30*c* are thereby respectively located between two clamping elements 7*a*, 7*b*, and 7*c* that are arranged radially-symmetrically around expanding wedge 6.

Rotary handle 8 has a slight play with regard to housing 2, so that the movement of rotary handle 8 is not hindered. Housing 2 can be manufactured correspondingly with relatively large tolerances. The guiding of ring 8 takes place via annular sleeve 9. The friction arising during a movement of rotary handle 8 is therefore kept low.

In FIGS. 6-10, a second embodiment of holder 1 is shown. In this embodiment, rotary handle 8 is fixed to housing 2 with the aid of two clamping rings 31 and 32 in such a way that an axial relative movement between rotary handle 8 and housing 2 is prevented. A rotary movement of rotary handle 8 is allowed, however. Components in this embodiment that correspond to the parts illustrated in the embodiment of FIGS. 1 through 5, are provided with the same reference numbers.

FIG. 7 shows a cross-sectional view of holder 1 according to FIG. 6. Rotary handle 8 is connected via its internal thread 11 to an external thread 10, which is embodied or formed as thread surfaces directly on slide element 15. Slide element 15 extends thereby through longitudinal grooves 17 and 18. A rotation of rotary handle 8 effects an axial movement of the slide element 15, since a rotation of slide element 15 is prevented because slide element 15 is guided in longitudinal grooves 17 and 18 in the housing so that is moveable only axially. The axial movement of slide element 15 is transmitted to expanding wedge 6 via spacer element 16. Expanding wedge 6, spacer element 16, and slide element 15 are connected to one another jointly via screw bolt 21. For this purpose, a nut 33 is arranged positively in slide element 15, into which screw bolt 21 is screwed. This results in a clamping of expanding wedge 6, spacer element 16, and slide element 15, so that these elements bear against one another without play.

Expanding wedge 6 interacts via wedge surface 25 with a mating wedge surface 26 of clamping element 7, so that an axial movement of expanding wedge 6 leads to a radial movement of clamping element 7. Thus, this mode of operation corresponds to the mode of operation of the first exemplary embodiment.

Clamping rings 31 and 32 are connected to housing 2 via catch projections 34 that engage in catch openings 35. However, other fastening possibilities for clamping rings 31 and 32 are also conceivable. Thus, these can be connected to housing 2, for example, by press fitting or adhesion.

In FIG. 8, a cross-sectional view of holder 1 is shown that is rotated by 90° from the view depicted in FIG. 7.

FIG. 9 shows holder 1, as seen from its front face 4. It can be discerned that slide element 15 is embodied or formed essentially as a rectangular with a correspondingly rounded surface at the side faces on which external thread 10 is arranged. Although only two clamping elements 7*a* and 7*b* are visible, clamping device 5 again has three clamping elements 7 that are arranged radially-symmetrically around expanding wedge 6.

Expanding wedge 6 again has guide webs 30*a*, 30*b*, and 30*c*, as shown in FIG. 10.

In the exemplary embodiments shown, the clamping device of the holder has respectively three clamping elements. It is also conceivable, however, to provide a different number of clamping elements, for example, four or five, which are likewise arranged radially-symmetrically around the expanding wedge. The expanding wedge then has a number of wedge surfaces corresponding at least to the number of clamping elements, so the wedge surfaces interact with the mating wedge surfaces of the clamping elements. In the exemplary embodiments shown, the clamping elements have respectively only one mating wedge surface. It is also conceivable to provide each clamping element with several mating wedge surfaces, so that the number of wedge surfaces must also be matched correspondingly to the expanding wedge. In the exemplary embodiments, the longitudinal grooves always run axially, in order to achieve as good a transmission as possible. Of course, other orientations are likewise conceivable.

The holder according to the invention for loudspeaker boxes can be used in many ways. Thus, for example, it can be arranged at the upper end of a box tripod or other tripod. Further, it can be embodied or formed in one piece with the tripod or also as a slip-on adapter. With an embodiment of the holder as a slip-on adapter, for example, a tripod is pushed into the adapter from its open front face 4 and clamped or locked. The front face 3 then essentially faces upwards, so that a loudspeaker box can be slipped onto the holder from above.

It is also conceivable, however, to provide the holder with two clamping devices and thus to use it as a satellite tube or distance tube between subwoofer and satellite box. In this case, a clamping device is arranged respectively at both axial ends of the holder, which devices can be actuated via their own rotary handle without tools and independent of one another. It is likewise conceivable to use the holder as a wall holder or ceiling holder.

According to the invention, it is possible to clamp the holder in a cylindrical recess of the loudspeaker box without tools. It is possible thereby to generate relatively large clamping forces with relatively small operating forces. It is therefore not necessary to use a tool to fix the loudspeaker box on the holder. It is considered to be advantageous to embody or form the control handle as a rotary handle and to convert the rotary movement that is introduced by an operator into an axial movement of an expanding wedge, which wedge leads to a radial movement of clamping elements. In this way, a uniform clamping is achieved with high clamping forces.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A holder for a loudspeaker box onto which the loudspeaker box can be slipped, comprising:

a control handle;

a clamping device actuatable without tools via the control handle;

a tubular housing in which the clamping device is arranged, wherein the clamping device has at least one clamping element structured and arranged to be radially movable through an opening in the housing, the clamping device has an expanding wedge structured and arranged for axial movement in the housing, and the expanding wedge has at least one wedge surface and the clamping element has at least one mating wedge surface, and the at least one wedge surface is structured and arranged to interact with the at least one mating wedge surface; and a slide element arranged in the housing in a rotationally fixed and axially moveable manner, the slide element being connected to the expanding wedge, wherein the control handle comprises a rotary handle arranged to act on the slide element, wherein the rotary handle surrounds the housing in an annular manner.

2. The holder in accordance with claim 1, wherein the clamping device has several clamping elements structured for radial movement through openings in the housing and arranged radially symmetrically around the expanding wedge.

3. The holder in accordance with claim 1, wherein the slide element is connected to the rotary handle by at least one groove in the housing.

4. The holder in accordance with claim 1, further comprising a spacer element arranged between the slide element and the expanding wedge.

5. The holder in accordance with claim 1, wherein the rotary handle is axially fixed on the housing.

6. A holder for a loudspeaker box onto which the loudspeaker box can be slipped, comprising:

a housing;

a control handle structured and arranged to surround the housing in an annular manner and to be supported via a threaded assembly;

a clamping device actuatable without tools via the control handle, wherein the housing comprises a tubular housing in which the clamping device is arranged, the clamping device has at least one clamping element structured and arranged to be radially movable through an opening in the housing, the clamping device has an expanding wedge structured and arranged for axial movement in the housing, and the expanding wedge has at least one wedge surface and the clamping element has at least one mating wedge surface, and the at least one wedge surface is structured and arranged to interact with the at least one mating wedge surface;

a slide element arranged in the housing in a rotationally fixed and axially moveable manner, the slide element being connected to the expanding wedge, wherein the control handle comprises a rotary handle arranged to act on the slide element; and a spacer element arranged between the slide element and the expanding wedge, wherein the spacer element has a radial passage opening and the slide element comprises a pin guidable through a radial passage opening.

7. A holder for a loudspeaker box onto which the loudspeaker box can be slipped, comprising:

a housing;

a control handle structured and arranged to surround the housing in an annular manner and to be supported via a threaded assembly;

a clamping device actuatable without tools via the control handle, wherein the housing comprises a tubular housing in which the clamping device is arranged, the clamping device has at least one clamping element structured and arranged to be radially movable through an opening in the housing, the clamping device has an expanding wedge structured and arranged for axial movement in the housing, and the expanding wedge has at least one wedge surface and the clamping element has at least one mating wedge surface, and the at least one wedge surface is structured and arranged to interact with the at least one mating wedge surface;

a slide element arranged in the housing in a rotationally fixed and axially moveable manner, the slide element being connected to the expanding wedge, wherein the control handle comprises a rotary handle arranged to act on the slide element;

a spacer element arranged between the slide element and the expanding wedge; and a screw bolt connecting the expanding wedge to the spacer element, wherein the screw bolt is screwed into the spacer element.

8. A holder for a loudspeaker box onto which the loudspeaker box can be slipped, comprising:

a control handle;

a clamping device actuatable without tools via the control handle;

a tubular housing in which the clamping device is arranged, wherein the clamping device has at least one clamping element structured and arranged to be radially movable through an opening in the housing, the clamping device has an expanding wedge structured and arranged for axial movement in the housing, and the expanding wedge has at least one wedge surface and the clamping element has at least one mating wedge surface, and the at least one wedge surface is structured and arranged to interact with the at least one mating wedge surface; and a slide element arranged in the housing in a rotationally fixed and axially moveable manner, the slide element being connected to the expanding wedge, wherein the control handle comprises a rotary handle arranged to act on the slide element, wherein the rotary handle has an internal thread that engages with a corresponding external thread of the holder, and wherein the slide element is guided in an annular groove of the rotary handle.

9. The holder in accordance with claim 8, further comprising an annular sleeve fixed to the housing, wherein the external thread is arranged on the annular sleeve.

10. The holder in accordance with claim 9, wherein the annular sleeve has openings and is connected to the housing by a bolt extending radially through the housing and into the openings in the annular sleeve.

11. The holder in accordance with claim 10, wherein the openings are covered by the rotary handle.

12. The holder in accordance with claim 8, wherein the slide element has at least one thread surface that is engageable with the internal thread of the rotary handle.

13. The holder in accordance with claim 12, wherein the expanding wedge is connected to the slide element by a screw bolt, and wherein the screw bolt is guided through the spacer element.

14. The holder in accordance with claim 13, wherein the screw bolt is positively held in the slide element with a nut.

15. The holder in accordance with claim 5, further comprising two clamping rings, wherein the rotary handle is fixed on the housing with the two clamping rings.

16. The holder in accordance with claim 15, wherein the housing has catch openings, and the clamping rings have catch projections structured and arranged to engage in the catch openings.

* * * * *